United States Patent [19]
Miller

[11] 3,985,100
[45] Oct. 12, 1976

[54] APPARATUS FOR IRRADIATING COMPOSITIONS

[75] Inventor: Emery P. Miller, Indianapolis, Ind.

[73] Assignee: Ransburg Electro-Coating Corporation, Indianapolis, Ind.

[22] Filed: Apr. 12, 1974

[21] Appl. No.: 460,438

Related U.S. Application Data

[60] Continuation of Ser. No. 375,662, July 2, 1973, abandoned, which is a division of Ser. No. 197,366, Nov. 10, 1971, abandoned.

[52] U.S. Cl. .................................. 118/643; 118/66; 118/73; 250/492 R
[51] Int. Cl.² ................... B05D 3/06; H01J 37/00
[58] Field of Search ..................... 117/93.3, 93.43; 118/642, 643, 49.5, 50.1, 662, 49.1; 250/453, 454, 491, 492, 492 R, 503, 504; 34/60; 427/53, 54

[56] References Cited
UNITED STATES PATENTS

| | | |
|---|---|---|
| 1,672,331 | 6/1928 | Mailey .................................. 34/60 |
| 1,702,043 | 2/1929 | Elliott .................................. 427/54 |
| 2,236,398 | 3/1941 | Drummond ..................... 118/643 X |
| 2,266,392 | 12/1941 | Durant et al. ................... 118/643 X |
| 2,542,064 | 2/1951 | Tilden ................................. 118/643 |
| 3,122,492 | 2/1964 | Barnes et al. ................. 118/49.5 X |
| 3,128,201 | 4/1964 | Gauthier ...................... 117/93.43 X |
| 3,506,825 | 4/1970 | Hartmann ..................... 250/454 X |

FOREIGN PATENTS OR APPLICATIONS

| | | |
|---|---|---|
| 1,026,166 | 3/1958 | Germany ............................. 427/54 |
| 280,495 | 5/1952 | Switzerland ....................... 118/642 |

Primary Examiner—Morris Kaplan
Attorney, Agent, or Firm—Merrill N. Johnson

[57] ABSTRACT

Complexly-shaped articles of EPDM material are treated with benzophenone by cleaning the article, coating it with benzophenone and irradiating the benzophenone-coated article with ultraviolet light. The complexly-shaped articles are uniformly treated by exposure within a reflective enclosure that bathes the article in light by transporting it while rotating around an ultraviolet source and between the source and the reflective enclosure.

4 Claims, 3 Drawing Figures

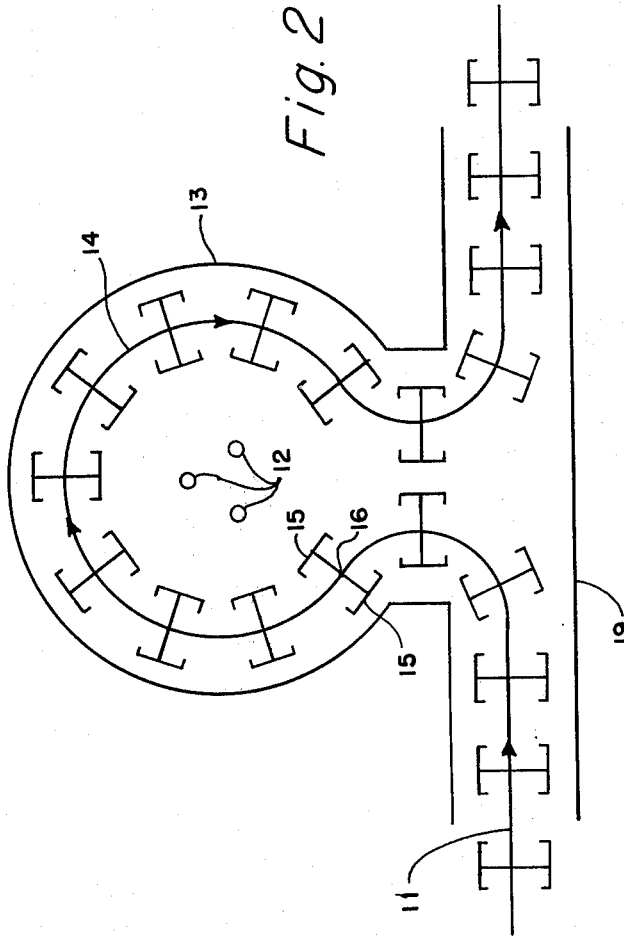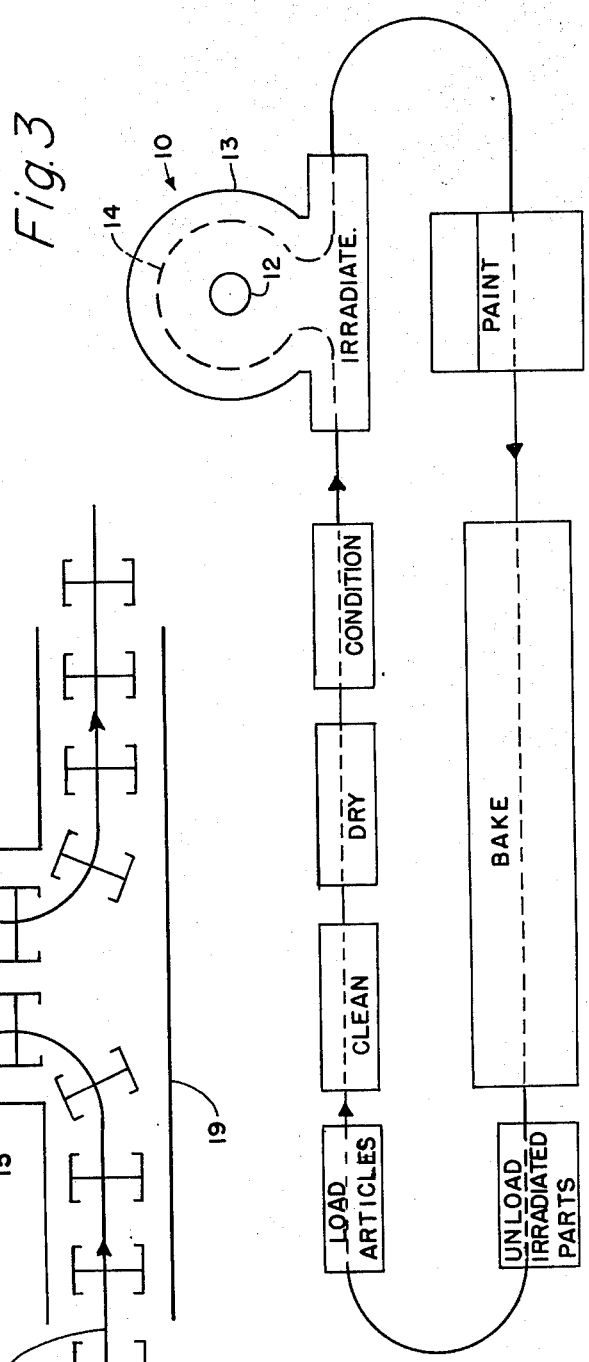

APPARATUS FOR IRRADIATING COMPOSITIONS

This patent application is a continuation of U.S. Patent Application Ser. No. 375,665, filed July 2, 1973 now abandoned, which was a division of copending U.S. Pat. Application Ser. No. 197,366, filed Nov. 10, 1971, now abandoned.

The present invention relates to a method of irradiating an article made of or carrying a composition of matter on its surfaces capable of being suitably activated and/or chemically changed when irradiated. Activation of the composition of material includes such phenomena as inducing a change in the electrical characteristics such as reducing the resistivity of the applied composition. Activation can also encompass the chemical change which results in the applied material so combining with the base material so as to increase the acceptability evidenced by the base material for subsequently applied coatings. A chemical change of the composition includes curing or accelerating polymerization of the composition. The source of irradiation may be a ultraviolet or light.

Known methods of exposing portions of an article to irradiation include moving the article in a relatively straight line path past the irradiation source. However, such a method of irradiating portions of the article results in a non-uniform activation and/or chemical change in the composition since the composition is subjected to variable irradiation intensities and variable lengths of exposure time. For example, portions of the article generally perpendicular to the irradiation source are subjected to greater irradiation intensities and longer lengths of exposure time than are portions of the article at some other angle to the irradiation source. It is seen that such a method is generally limited to irradiating extended flat portions of the article or to irradiating the portions of the article from two or more irradiation sources positioned on opposite sides of the path over which the article is moved. Further, most sources of irradiation are essentially linear and as such are best adapted to irradiate portions of such extended flat article surfaces or articles over a comparatively short period of time as the article is moved past the source of irradiation. The short exposure time of the article to the irradiation source requires that the source have a relatively high intrinsic intensity if a high dosage or quantity of radiation is required to activate the composition carried by the article. In addition, some materials are sensitive to exposure time as well as radiation intensity so that a long exposure time at low intensity is preferred over a short exposure time at high intensity.

The present apparatus overcomes the above problems and accomplishes irradiation of the composition carried by the article within a relatively small area. By utilizing the present method, adequate irradiation of all portions of even complex three dimensional articles can be achieved. The irradiation is not concentrated along those areas of the article nearest to the source of irradiation while other areas of the article receive insufficient irradiation as might otherwise occur if one used previously suggested methods of irradiating the composition at the surface of the article. More specifically, the article to be irradiated is transported by a conveyor in an arcuate path or loop around the irradiation source while the article is rotated about an axis substantially parallel to the axis of the arcuate path. The arcuate path may be likened to the Greek letter omega. Hangers carrying the articles to be irradiated project downwardly from the conveyor and are used to support and transport the articles to be irradiated around the source of irradiation. The hangers are attached to the conveyor in such a manner that each hanger is rotated as it is carried along so that the article suspended therefrom is rotated about the axis of that hanger as the article is transported around the source of irradiation. Rotating the article as the article is transported around the source of irradiation presents all portions of the article to the source of irradiation a number of times so that substantially all portions of the article are exposed to the source a substantially equal amount of time. In this way the portions of the article carrying the composition to be irradiated are exposed to an accumulated irradiation dosage which in excess of that which can be obtained by transporting the article past the irradiation source in a straight line. Preferably, the source of irradiation has a height equal to the length of the longest article suspended from the conveyor. However, the source of irradiation, if desired, may be reciprocated in the vertical plane during the movement of the article therearound so as to substantially uniformly irradiate all portions of the article carrying the composition yet reduce the overall length of the source. It may be less expensive to reciprocate the irradiation source than to provide a source having the height necessary to appropriately irradiate an article.

The apparatus of the present invention is particularly applicable to articles having variable surface contours that would normally require exposure to a source of irradiation from several different directions to accomplish the desired uniform irradiation of the composition carried by the article. A plastic handle for an electric hand iron or a radiator grill assembly for an automobile are examples of articles having variable surface contours that can be effectively uniformly irradiated using the method of the present invention.

The appended drawings are intended to illustrate apparatus embodying the concepts of the present invention constructed to function in the most advantageous mode presently devised for the practical application of the principles involved in the hereinafter described invention.

In the drawings:

FIG. 2 is a top view, with portions thereof removed, of the system shown in FIG. 1;

FIG. 3 is a flow diagram showing the sequence of steps of a method in which is embodied the system of FIG. 1;

Figure 1:
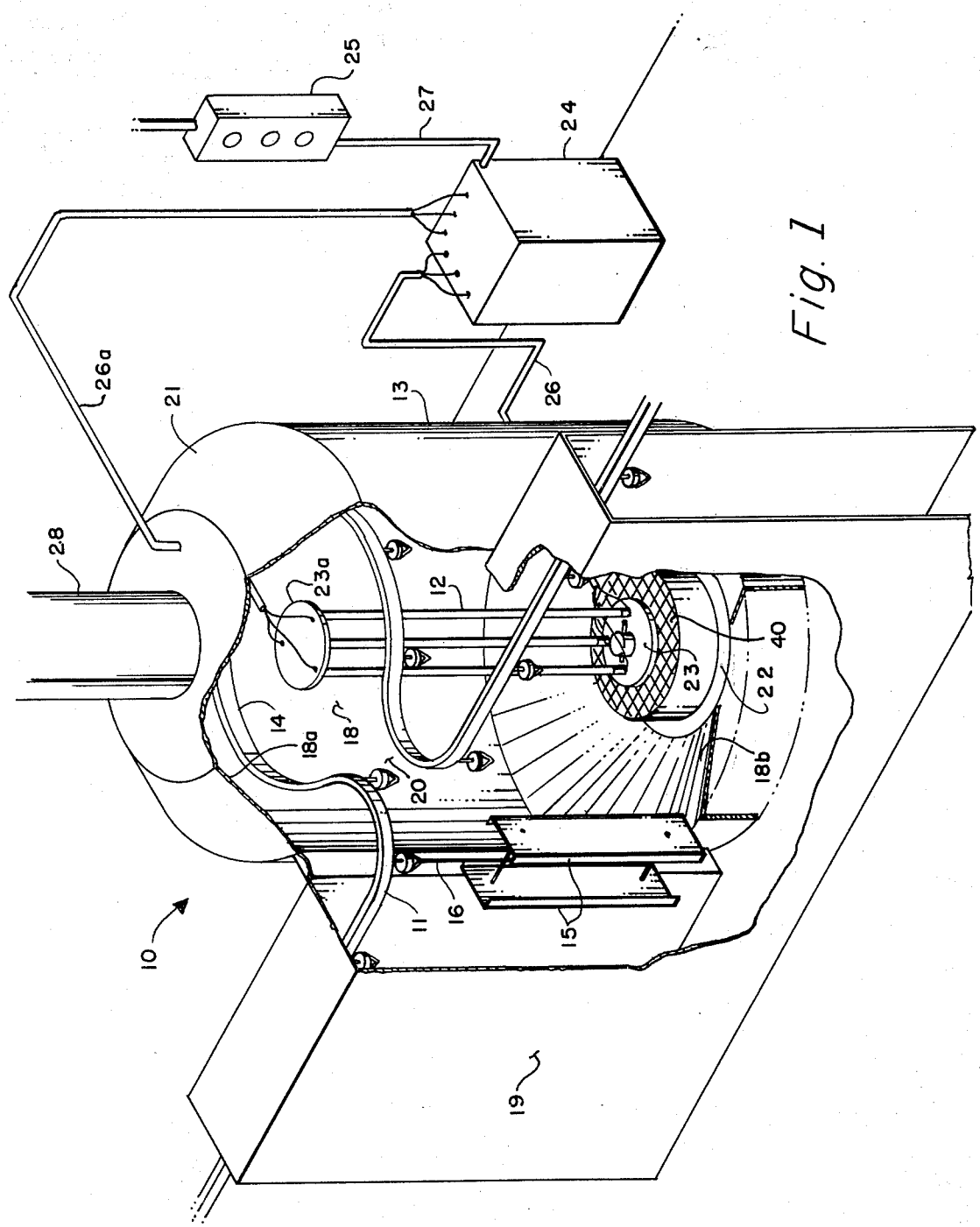
FIG. 1 is a perspective view, with sections removed, of an irradiation system embodying the concepts of the present invention.

Referring now to FIG. 1, a system embodying the concepts of the present invention is indicated by the reference number 10. System 10 includes a conveyor 11, a source of irradiation 12 and an enclosure 13.

Conveyor 11 includes means for transporting a plurality of articles 15 in an arcuate path 14 around irradiation source 12. During travel around the irradiation source, the articles 15 are suspended from the conveyor by hangers 16. Each hanger 16 is rotated about its axis by allowing a portion of the hanger to come into contact with a suitable concentric rub bar means (not shown) as articles 15 are transported around source of irradiation 12. Rotating articles 15 present substantially all portions of each article a number of times to irradiation from source 12 so that the composition on all portions of the article is irradiated a substantially equal amount of time.

Source of irradiation 12 as illustrated in FIG. 1, includes three extended tubular ultraviolet lights situated at the approximate center of the arcuate path 14. Referring to FIGS. 1 and 2, it should be seen that the distance from source 12 to the articles 15 during irradiation is substantially constant. The ultraviolet lights of source 12 are retained between supports 23 and 23a. The source of irradiation is energized by a power supply 24 having outputs connected to the opposite ends of the source 12 through electrical cables 26 and 26a. The electrical energy supplied to source 12 is regulated by control panel 25 connected to the input of the power supply 24 through cable 27.

Preferably, the lengths of the tubular lights comprising source 12 are substantially equal to the vertical length of the largest article to be irradiated. However, the source of irradiation may be reciprocated over the arcuate path axis by suitable means (not shown) such as by a pneumatic piston over the length of the article so as to uniformly irradiate the composition on the surface of the article to thereby reduce the overall length of the irradiation source. Reciprocating the source 12 over the article may be less expensive than providing a source having the length necessary to properly irradiate the composition on the surface of the article. The reciprocator can include control means (not shown) for varying the stroke length of the piston of the reciprocator to thereby accommodate articles of variable length; that is, the control means can be programmed so as to provide a piston having a stroke length of either, for example, 19 inches, 36 inches, 48 inches or the like.

A plurality of linear irradiation sources can be, in some instances, substituted for the tubular lights. The plurality of linear irradiation sources are arranged to direct irradiation radially from source 12.

Enclosure 13, about the outside of the arcuate path 14 of the conveyor 11, substantially encloses the arcuate portion of the conveyor. Enclosure 13 includes an inner surface 18 which is an effective reflector of irradiation of the type that is emitted by source 12. It is seen that the irradiation which passes by articles 15 through the void space between adjacent articles strikes surface 18 of enclosure 13 and is reflected with high efficiency back toward the source 12 so as to irradiate the side of the article opposite from the side closest to the source. Preferably, the reflector 18 is curved so as to substantially conform to the general curvature of the arcuate portion 14 of conveyor 11. Enclosure 13 also includes a top portion 21 and a bottom portion or floor 22 that effectively closes the top and bottom of the enclosure and each is suitably inclined or shaped to enhance reflection of the irradiation toward the enclosure center. Preferably, the top portion 21 and the bottom portion 22 of enclosure 13 also include reflective surfaces 18a and 18b, respectively, over the extent thereof. The reflectors 18, 18a and 18b in the enclosure are made of any suitable reflectorized material for the specific radiation being used. Certain selected plastic coatings as well as certain aluminum alloys are examples of excellent reflectors of ultraviolet light in the wave length region between 2000 and 4000 Angstrom units. It should be seen that enclosure 13 funtions as an integrating sphere in the sense that irradiation is utilized in multiple reflections of diminishing intensity. This feature makes it possible to utilize a source of irradiation having less intrinsic intensity than is otherwise possible while still exposing the articles to an accumulated intensity that is relatively high.

Barrier 19 is positioned across opening 20 of the arcuate portion 14 of the conveyor. Barrier 19 serves to confine the radiation to the enclosure and, hence, not allow users in close proximity to system 10 to be subjected to harmful irradiation. The barrier 19 should extend so that radiation from the source can reach the outside, if at all, only after many reflections.

By utilizing the system shown in FIG. 1 and its method, adequate irradiation of all portions of the composition carried on the various surfaces of articles 15 can be achieved and irradiation is not concentrated at portions of the article nearest to the irradiation source.

If a suitable chemical is applied to the polyethylene surface and then that material is subjected to ultraviolet irradiation, a chemcial change can be effected at the polyethylene surface which thereafter renders it very receptive and adherent for the same adhesives. After being irradiated it can also be coated with an appropriate finishing material and that coating will adhere well against subsequent abrasion.

An article fabricated from polyethylene when coated with up to a 40% solution of benzophenone in toluol and dried and then subjected to the radiation from an ultraviolet source having a wave length of about 2000 to about 4000 Angstrom units for up to about 45 seconds can thereafter be coated with a polyisocyanate to provide a coating on the polyethylene which will be suitably bonded thereto due to the chemical change induced at the polyethylene surface. United States Letters Pat. No. 3,600,289 discloses irradiation of surfaces with ultraviolet light and then treating the irradiated surfaces with polyisocyanate. Further, a rigid polyurethane elastomer surface coated with an admixture including up to 3% by weight of an alkyl quaternary ammonium salt, up to 3% by weight benzophenone, and the remainder a liquid carrier containing textile spirits and up to 5% by weight butanol when dried and irradiated by an ultraviolet source having a wave length of about 2000 to 4000 Angstrom units for up to about 20 seconds will effectively cause the admixture to cross-link and adhere to the polyurethane surface. After irradiation and exposure to a relative humidity of about 80% or higher at room temperature for 20 to 30 seconds, such surface in addition is found to be electrically conductive.

It should be noted that if neither of the above compositions are irradiated neither composition adheres to the surface of the article. In other words, air drying or drying at elevated temperatures alone is not a satisfactory solution to the adherence difficulty.

Under certain conditions, irradiating articles 15 by source 12 can be accompanied by the evolution of considerable heat and gasses that may require removal from system 10. FIG. 1 shows a stack 28 provided in top portion 21 of enclosure 13 to assist in removing waste heat and gas.

In the event that it is necessary, the atmosphere in enclosure 13 can be made to move or flow upwardly toward and out stack 28 by providing in the floor of the enclosure adjacent the irradiation source a grill opening 40. Where desirable, a suitable gas inert to the composition being irradiated as well as to the effect of the irradiation itself can be introduced through the bottom portion 22 of enclosure 13 and caused to flow toward and out stack 28.

Referring now to FIG. 3, a flow diagram showing a suggested sequence of steps of a method embodying the system and method shown in FIG. 1 is illustrated. The sequence of steps shown in FIG. 3 are illustrative and are not limiting. It should be appreciated that different articles, different compositions to be irradiated and the like may require a modification in the sequence of steps. This flow diagram specifically shows the steps to be followed in the conditioning of an EPDM surface (ethylene; propylene; 1, 4-hexadiene; and fluorine-containing polymers surface) so that a subsequently applied urethane enamel adheres to the surface sufficiently to allow stressing the surface without it cracking or checking off. Articles 15, for example, are metal bases over which EPDM layers have been applied, are loaded on conveyor 11 and suspended therefrom by hangers 16. The articles are then subjected to a suitable cleaning or degreasing step to remove contaminants from the surfaces of the EPDM without otherwise physically or chemically modifying the EPDM surface. The EPDM surface is then dried at an elevated temperature so as to remove the residue of the rinse used to clean the article. During the conditioning step, a 30% solution of benzophenone in toluol is applied to the EPDM surface and dried so as to provide a coating of solid benzophenone. The article with its benzophenone coated EPDM surface is transported to the arcuate portion 14 of the conveyor 11 to be irradiated by irradiation source 12 following the teaching of the invention as described above.

The EPDM surface of the article coated with benzophenone is up to 24" from irradiation source 12. Source 12 emits ultraviolet light at about 9600 watts having a wave length of about 2000 to 4000 A. The article is irradiated for about 45 seconds as it passes about the loop in the conveyor. After irradiation, the EPDM surface of the article is coated with a layer of a urethane coating material. This coating is cured on the surface by subjecting the article to a temperature of about 275° F for about 35 minutes in the bake section. The coating on the surface of the article is bonded thereto and exhibits adhesion against deformation of the surface.

While having shown and described the presently preferred embodiments of my invention, it is to be understood that such embodiments are capable of modification.

I claim:

1. Apparatus for treating the surface of a complexly-shaped article of EPDM material, comprising means to remove contaminates from the EPDM surface of the complexly-shaped articles; means to dry the EPDM surface and to remove any residue remaining after removal of the contamination; means to apply to the EPDM surface a solution of benzophenone and solvent so as to provide a coating of benzophenone on the complexly-shaped EPDM surface; a source of substantially radially ultraviolet light diverging radiation; means to transport the complexly-shaped article through said contaminate removal means, drying means and benzophenone-applying means and to transport the complexly-shaped article with its benzophenone-coated EPDM surface in a generally arcuate path around the source; a reflective enclosure for said source to intercept substantially all of diverging radiation and configured to direct the reflected radiation at the source article, said enclosure including a reflective floor and a reflective roof and further including means to feed an inert purge gas through the bottom thereof and an exhaust stack disposed at the top thereof, said enclosure further including a barrier means to confine said radiation to the enclosure and to enclose the means to transport the article as it enters the enclosure, said means to transport the article being arranged to move the article in a generally arcuate path lying between the source and the reflective enclosure surface and to rotate the complexly-shaped article about an axis as it is transported along the arcuate path to irradiate substantially all of the benzophenone carried on the complexly-shaped article.

2. The apparatus of cliam 1, wherein the axis of rotation of the means to rotate the article is substantially parallel to an axis through the center of the arcuate path.

3. The apparatus of claim 1, wherein the means to rotate the surface is constructed to rotate the article a number of times as the article passes around the source.

4. The apparatus of claim 1, including means operatively associated with said means to transport to apply a coating of urethane coating material to the irradiated EPDM surface, a means to cure the coated surface subjecting the article to an elevated temperature.

* * * * *